United States Patent [19]
Renko et al.

[11] Patent Number: 6,148,203
[45] Date of Patent: Nov. 14, 2000

[54] METHOD FOR REGISTERING A COMMUNICATION DEVICE FOR COMMUNICATION SERVICE

[75] Inventors: Mitchell E. Renko, Coral Springs; David S. Seekins, Sunrise; Pablo Marcilla, Coral Springs, all of Fla.

[73] Assignee: Motorola, Inc., Schaumburg, Ill.

[21] Appl. No.: 09/263,538

[22] Filed: Mar. 8, 1999

[51] Int. Cl.[7] ............................................. H04Q 7/20
[52] U.S. Cl. .................. 455/434; 455/62; 455/166.1; 455/435
[58] Field of Search ...................... 455/434, 432, 455/435, 516, 62, 166.1, 166.2

[56] References Cited

U.S. PATENT DOCUMENTS 5,586,338  12/1996  Lynch et al. .
5,732,349  3/1998  Sanpei et al. ........................ 455/435
5,734,980  3/1998  Hooper et al. .
5,937,351  8/1999  Seekins et al. ....................... 455/434

*Primary Examiner*—Lee Nguyen
*Attorney, Agent, or Firm*—Scott M. Garrett

[57] ABSTRACT

A communication device (100) contains a plurality of bandmaps in a memory (102). Upon powering up the device, the device first scans frequencies listed in a learned bandmap (104). If no suitable carrier signals are detected, the device scans the frequencies listed in a present regional bandmap (106), and this scan may be repeated several times. Upon failing to detect a suitable carrier at any of the frequencies listed in the present regional bandmap, the device alternates between scanning the present regional bandmap and segments of a world wide bandmap (108), which is a comprehensive list of all possible frequencies at which the device may operate. If a carrier is detected indicating the device is in a new region, the regional bandmap corresponding to the new region is set to be used as the present regional bandmap.

11 Claims, 4 Drawing Sheets

METHOD FOR REGISTERING A COMMUNICATION DEVICE FOR COMMUNICATION SERVICE

TECHNICAL FIELD

This invention relates in general to wireless communication services, and more particularly to methods for locating a serving network in a new region.

BACKGROUND OF THE INVENTION

Wireless communication devices, such as cellular telephones, are used in major metropolitan areas all around the world. However, conventional communication devices don't travel well. As a user goes from one region of the world to another, it is very likely that the communication device he or she is used to using at home does not work in a foreign country. Most likely this is simply because different frequencies are used in different countries for wireless communication, and a communication device bought and used in one region is not designed to work in another region that uses different frequencies.

Some manufacturers of communication devices have addressed this problem. For example, some cellular telephones are designed to use an interchangeable memory card that, among other things, has a list of frequencies to be used in a particular region. This method is effective, but places a burden on the user to remember to purchase additional memory cards for each region he or she is planning on visiting. Furthermore, these cards are easy to lose. Accordingly, many people perceive the use of memory cards as ungainly, and would prefer another option.

An alternative option to memory cards is to simply store a list of all operating frequencies used world wide in the communication device, and begin scanning the list every time the device is powered up. However, this method is not practical because there can easily be thousands of frequencies, especially in linearly modulated digital communication systems since the channel spacing can be very narrow. The time it would take to register for communication service by having to scan the entire list would be on the order of minutes. This would likely not be acceptable for consumer markets. Thus, there is a need for a way by which to eliminate the need for memory cards by including all possible frequencies in the communication device, but without having an excessively long registration time.

DETAILED DESCRIPTION OF A PREFERRED EMBODIMENT

Figure 1:
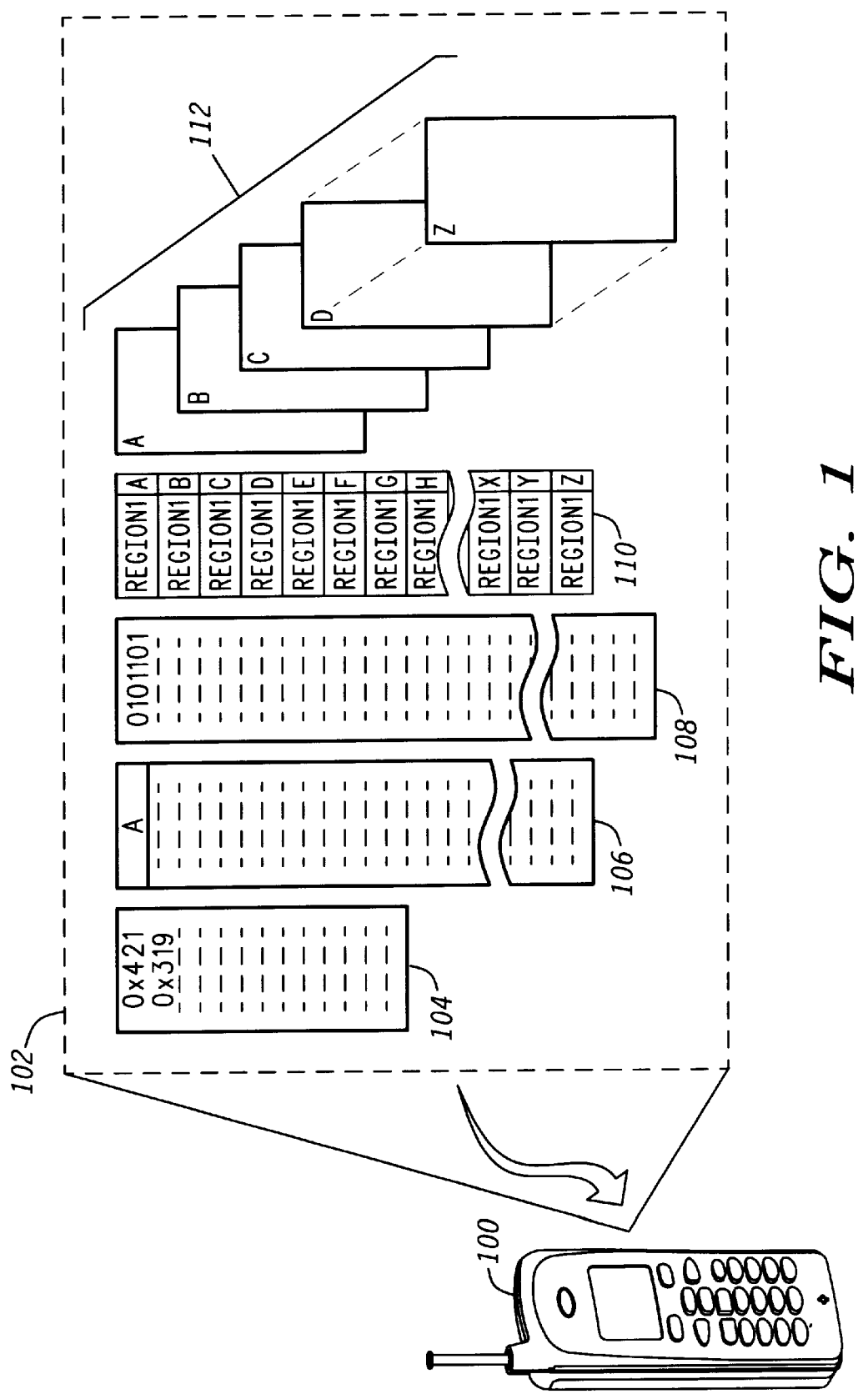
FIG. 1 shows a wireless communication device containing a series of bandmaps, in accordance with the invention.

While the specification concludes with claims defining the features of the invention that are regarded as novel, it is believed that the invention will be better understood from a consideration of the following description in conjunction with the drawing figures, in which like reference numerals are carried forward.

The present invention solves the problem of long registration times by reducing the time it takes the communication device to find an appropriate carrier and register, while containing a world wide bandmap of all frequencies used world wide. The method by which the reduction in time is achieved is by realizing that, upon powering up the communication device, it will usually be in a familiar serving cell. If it is not in a familiar serving cell, it will usually be in the same world region in which it was last used. If it seems that no carrier associated with the last known world region can be found initially, it is usually because of some interference or lack of sufficient signal strength. However, it would then also become possible that the communication device is in a new region in which a different set of carrier frequencies is used. Upon the occurrence of this condition, the communication device alternates between scanning the last used region bandmap, and successive sections of the complete world wide bandmap. When a carrier is found, information can be read from associated control channels to determine if the present communication system is one in the last known operating region, or a new region.

Referring now to FIG. 1, which shows a wireless communication device 100 containing a memory 102 having a plurality of frequency lists or bandmaps stored therein. Each bandmap is, essentially, a list of values representing carrier frequencies which the communication device use to tune its transceiver when attempting to access communication resources on those frequencies. In normal, routine operation of the communication device, the user does not go outside of a given sub-region, and the carriers of that small area are stored in a learned bandmap 104. The learned bandmap is a dynamic memory list that changes so that the most recently visited serving cell frequencies are readily available. A more complete description of the learned bandmap can be found in commonly assigned U.S. patent application Ser. No. 08/957,277, entitled "Method for Establishing a Wireless Communications Link in a Reduced Time", the disclosure of which is hereby incorporated by reference. There, the learned bandmap is referred to as a "preferred" bandmap, and should not be confused with a preferred service provider's allotted frequencies. It is simply a listing of recently visited serving cell frequencies which is updated as the communication device travels from one serving cell to another. In most instances, when a communication device is powered up, it will be in one of the recently visited serving cells.

The learned bandmap is always comprised of frequencies listed in a present regional bandmap 106. The present regional bandmap is a comprehensive list of all frequencies used in the particular region of the world where the communication device was last shut off. It can also be the frequencies used by a particular service provider within a particular region if there is more than one service provider is operating in that region. If, upon powering up and scanning all the frequencies of the learned bandmap, no suitable carriers are found, the communication device will begin scanning the present regional bandmap. That is, all of the frequencies listed in the present regional bandmap will be scanned, preferably excluding those already listed in the learned bandmap. If a suitable carrier is not detected upon scanning the present regional bandmap, it is preferable to repeat the scanning of the present regional bandmap at least once since, for example, the user of the communication device may have powered up the communication device in an area of weak signal coverage, such as inside an elevator. Typically, a weak signal scenario is more common than when the user powers up the communication device in a new region that uses a different regional bandmap.

However, upon scanning the present regional bandmap, and preferably having repeated the scan several times, if no carriers are found, then it is possible that the communication device is no longer located in the region corresponding to the present regional bandmap. It may also be possible that the communication device is still in the region corresponding to the present regional bandmap, but in a weak signal zone. The memory also comprises a world wide bandmap 108, which is a comprehensive list of all frequencies used world wide.

The world wide bandmap may have 1500–2000, or more frequencies listed. It will be appreciated by those skilled in the art that these frequencies correspond to carriers on which a primary control channel may be found by the communication device, if the carrier is being transmitted by a service provider's infrastructure equipment in the vicinity of the communication device. To be accessible by the communication device, the signals must be in a format used by the communication device, meaning it has the correct modulation scheme, digital encoding scheme, and so on. In the preferred embodiment, the communication device communicates using a quadrature amplitude modulation (QAM) scheme to send and receive digital information. More specifically, a quad-QAM scheme is used where four QAM baseband signals are frequency multiplexed together, and used to modulate intermediate frequency and carrier wave frequency signals. An example of such a system is that sold my Motorola, Inc. under the trade name iDEN.

Since, after scanning the present regional bandmap several times, it is equally possible that the communication device is in a new region, or still in the region corresponding to the present regional bandmap but in a weak signal zone, the communication device should both continue scanning the present regional bandmap frequencies, and scanning for carriers from other regional bandmaps. One approach would be to alternate between scanning the present regional bandmap and the world wide bandmap, excluding those frequencies already scanned in the present regional bandmap. However, scanning all the frequencies listed in the world wide bandmap could take an unacceptably long period, especially if the communication device is simply in a weak signal zone, but then enters an area of sufficient signal strength.

Therefore, according to the invention, the preferred method of attempting to locate a suitable primary control channel (PCCH) on a carrier is to alternate between scanning the present regional bandmap frequencies, and consecutive segments of the world wide bandmap. A primary control channel is a communication resource transmitted by a serving cell to inform communication devices in the vicinity of certain system parameters, such as where to locate a broadcast control channel (BCCH) to facilitate registration. If a PCCH is detected during a scan of the present regional bandmap, then registration takes place in the conventional manner. If, however, a PCCH is detected while scanning frequencies from one of the segments of the world wide bandmap, then the BCCH is located, and a public land mobile network (PLMN) code is read from the BCCH. The PLMN code comprises a mobile country code (MCC) and a mobile network code (MNC). As such, the PLMN, in such an instance, will likely indicate that the communication device is in a different region from the one corresponding to the present regional bandmap, and a new regional bandmap is needed.

The memory 102 further comprises an index 110 and a plurality of regional bandmaps 112. Each of the regional bandmaps list frequencies used in a particular region of the world, and perhaps even more specifically, frequencies used by a particular service provider in a particular region of the world. Generally, the MCC indicates a country or geographic region, while the MNC can indicate a particular service provider. By service provider it is meant the company or organization that owns or operates the fixed equipment that grants wireless communication devices communication service. Once the communication device has determined that the frequency or frequencies detected are from a different regional bandmap, the communication device reads the PLMN code and cross references the index 110 to determine which regional bandmap corresponds to the new PLMN code. Once that is accomplished, the device reassigns the new regional bandmap as the present regional bandmap, and commences with registration.

Figure 2:
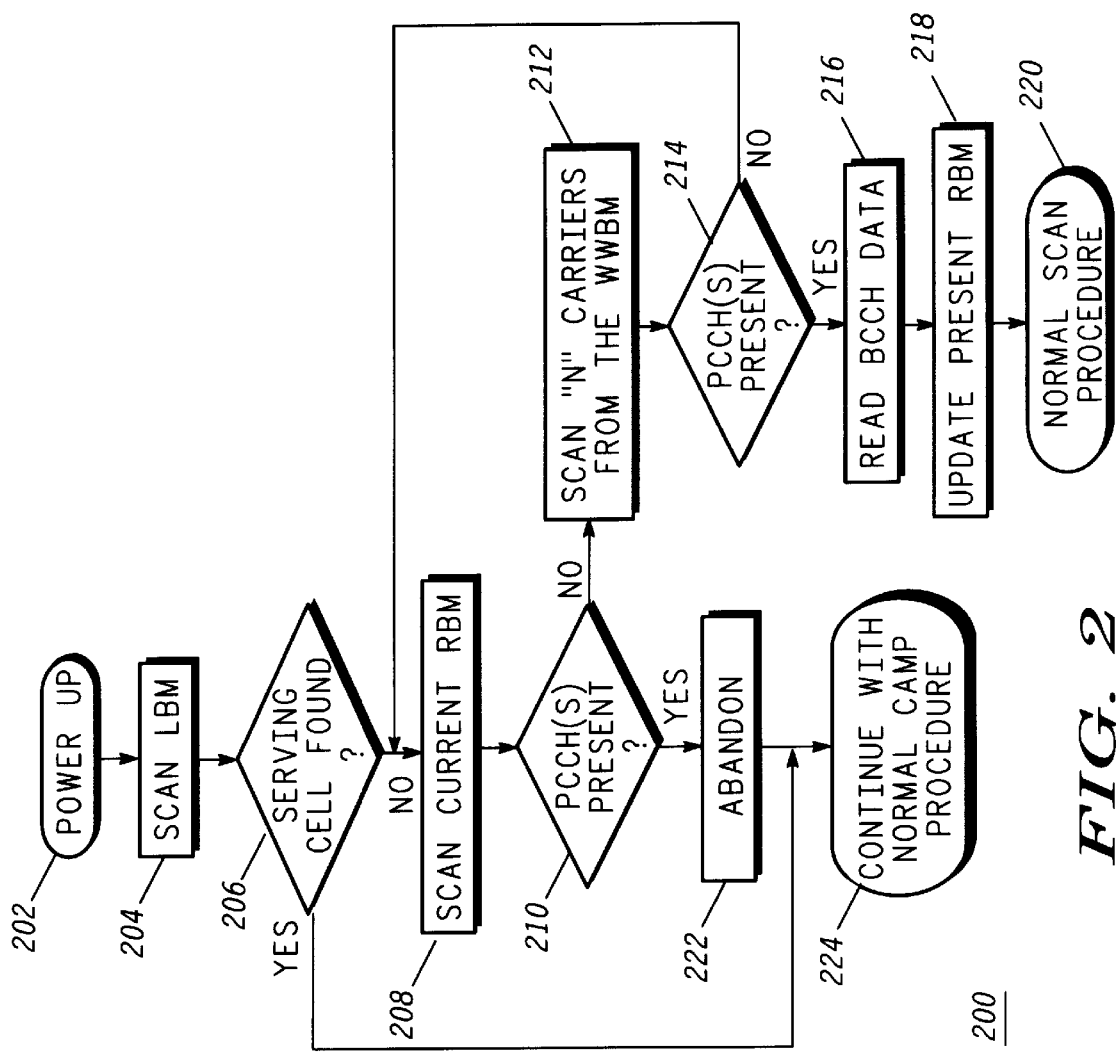
FIG. 2 shows a flow chart diagram of a method for registering a communication device service, in accordance with the invention.

Referring now to FIG. 2, there is shown a flow chart diagram 200 of a method for registering a communication device for service, in accordance with the invention. The device is initially provided with a learned bandmap, a world wide bandmap, and a plurality of regional bandmaps. These may be programmed into the device at the time of manufacture, or some time thereafter. Upon powering up (202) the device, the device begins scanning the learned bandmap (204). In the preferred embodiment, the device is attempting to detect (206) a PCCH at one or more of the frequencies listed in the learned bandmap, indicating the presence of a serving cell with sufficient signal strength to provide communication service. If no suitable PCCHs are found, the device then begins scanning the present regional bandmap (208). In the preferred embodiment, this step is repeated at least twice, and maybe as many as twenty times. After the first pass through, where it has omitted frequencies listed in the learned bandmap, the device may scan all frequencies in the present regional bandmap during subsequent scans of the present regional bandmap. Again, the device is attempting to detect (210) a PCCH on one of the frequencies listed in the present regional bandmap, and preferably only those that were not already scanned from the learned bandmap. If, after scanning the present regional bandmap, no suitable PCCHs are detected, the device scans a segment or subset of frequencies listed in the world wide bandmap (212). As before, the device is attempting to detect (214) a suitable PCCH. If none are found, then the device again scans the present regional bandmap (208). The device continues alternating between scanning successive segments of the world wide bandmap and the entire present regional bandmap. If, while scanning frequencies selected from the world wide bandmap, a PCCH is found, the BCCH of the serving cell transmitting the PCCH will be read (216) to obtain the PLMN code, and the present regional bandmap will be updated (218) with whichever of the plurality of regional bandmaps 112 is indicated by the PLMN code. Once the present regional bandmap is updated, a normal scan ensues (220) to update the learned bandmap, and choose the strongest serving cell in the area. If, while performing a scan of the present regional bandmap (208, 210), a PCCH is found, the multiple bandmap method is abandoned (222) and normal registration takes place (224). This is, of course, also true if a PCCH is found while scanning the learned bandmap.

The size of the subset is preferably determined by deciding on a total number of scans to be performed before, for example, notifying the user that no service was available. This selection is dependent on the time it takes to perform a scan. The size of the segments or subsets dictates how many time the present regional bandmap is scanned. For example, if the subset size is set equal to half the number of frequencies in the world wide bandmap, then all the frequencies of the world wide bandmap are scanned (once through the entire world wide bandmap), and the present regional bandmap will be scanned twice. If the number selected is equal to one tenth, then the present regional bandmap will be scanned, at most 10 times, and the remaining frequencies in the world wide bandmap once.

If, for example, a manufacturer decides that the longest time a typical user is willing to wait to either get service or a "no service" message is equal to the time it takes to perform 2500 scans, it is a matter of adding up the number of frequencies in the learned bandmap, plus the remaining frequencies in the present regional bandmap times the number of times it is scanned, plus once through the world wide bandmap. At this point the total will be somewhere less than 2500. The remainder between the present total and the maximum number of scans, 2500 in this example, can be divided by the number of frequencies in the present regional bandmap. Typically this number will be around 80–100 frequencies. The result, N, will be the number of times the present regional bandmap can be scanned in addition to all the other scans mentioned thus far. Accordingly, the world wide bandmap should be divided into N segments. Dividing the total number of frequencies, minus the number in the present regional bandmap, by N, therefore determines the number of frequencies to scan each time between repeating the scanning of the present regional bandmap. Thus the method of selecting the number of frequencies to be scanned in each subset of frequencies of the world wide bandmap comprises selecting a maximum total frequency scans to perform, and selecting an optimal number of frequencies to be included in the next subset based on the maximum total frequency scans to perform. The maximum total frequency scans to be performed depends on a subjectively chosen period of time, based on what a user might perceive as too long.

Figure 3:
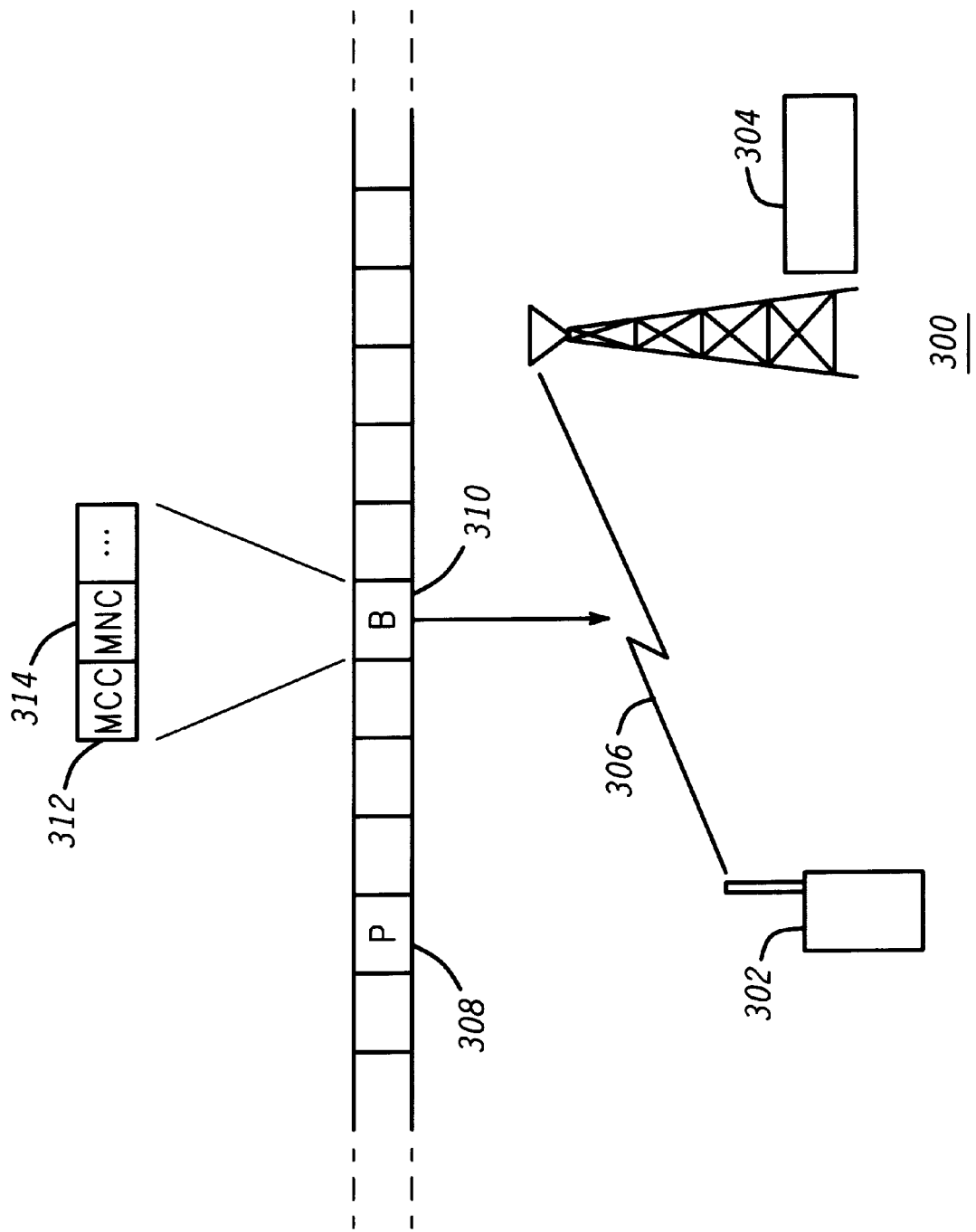
FIG. 3 shows a system diagram including control channels in a signal for a communication device and a serving cell, in accordance with the invention.

Referring now to FIG. 3, there is shown a system diagram 300 including control channels in a signal between a communication device 302 and a serving cell 304, in accordance with the invention. The serving cell is a geographic area in which a base station is located and provides over the air communication resources 306. In the preferred embodiment, the serving cell transmits a time division signal, in which is a time slot constituting a PCCH 308, and a BCCH 310, as is conventional in the art. The information in the BCCH includes a PLMN code comprised of a MCC 312 and a MNC 314. These resources are used by the communication device to determine if the present regional bandmap is applicable or not. In addition to checking this prior to registration, the device may check PLMN codes of new serving cells as it travels from one to another during normal operation. If the PLMN code of a new serving cell indicates a new regional bandmap is needed, the new one is found via the index 110, and set to the present regional bandmap.

Figure 4:
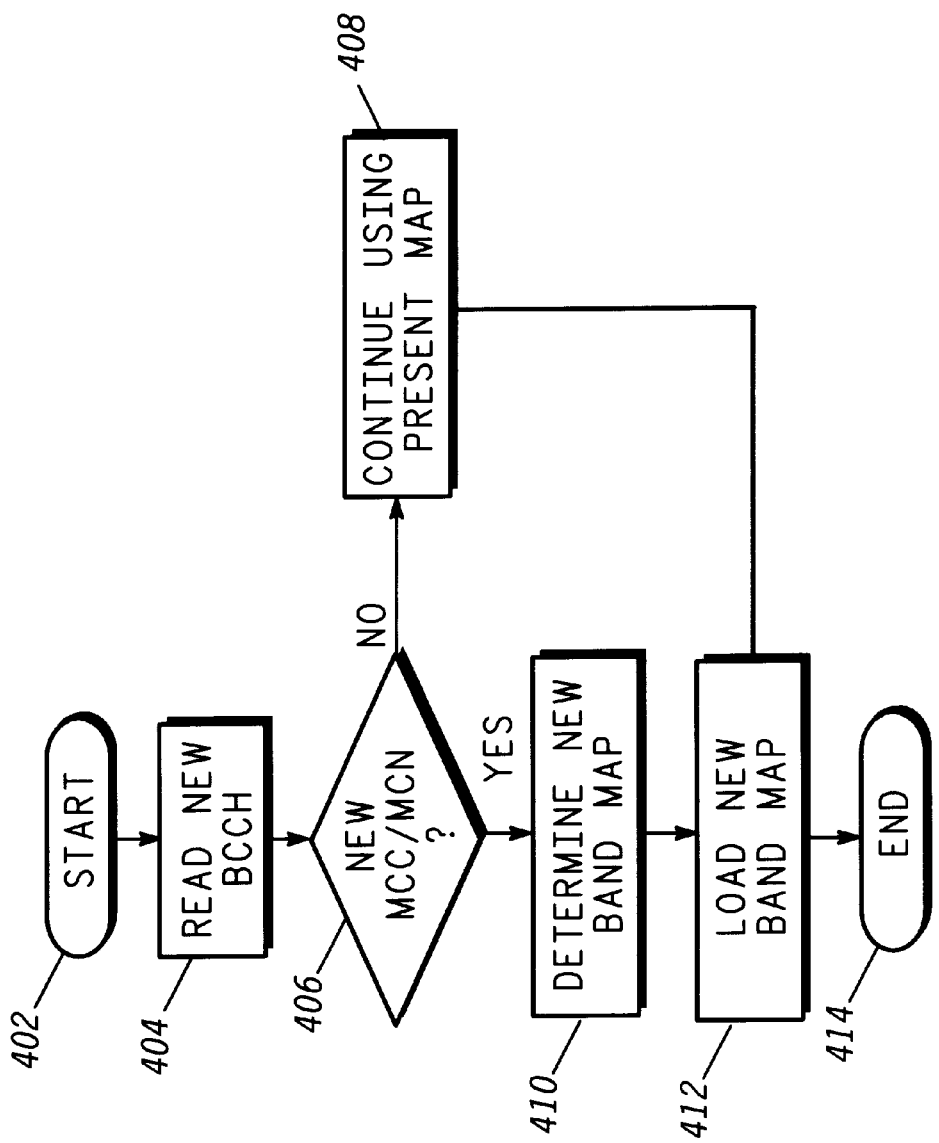
FIG. 4 shows a flow chart diagram of a method for managing a present bandmap in accordance with the invention.

In FIG. 4 a method for managing the present bandmap is shown in a flow chart diagram 400. At the start (402) the communication device is switching from a first serving cell to a second serving cell, after detecting the second serving cell. Among other events that occur during a hand of between cells, the device reads the BCCH of the target cell (404). The device compares (406) the MCC and MNC of the BCCH to that of the present regional bandmap. If there is no need to change (408) then the present regional bandmap is kept.

If the device finds that the MCC is a different MMC from that of the present regional bandmap, then the device determines (410) which regional bandmap corresponds to the new MCC/MNC, and loads (412) or otherwise sets the new regional bandmap as the present regional bandmap. The device then continues operation normally with the new present regional bandmap (414).

Thus, the invention solves the problem of long registration times in communication devices that are powered up and no suitable signal is initially detected. The present invention provides for both possible scenarios; starting up in a familiar region, but in a weak signal zone, and starting up in a new region. By alternating between scanning segments of the world wide bandmap and the present regional bandmap, the time needed to register the communication device for service will, on average, decrease. The present invention also permits for all known frequencies to be scanned within a predetermined time by selecting the size of the segments.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for registering a communication device for communication service, comprising:

providing a world wide bandmap in the communication device, the world wide bandmap comprising a list of all frequencies at which the communication device may find a primary control channel (PCCH);

providing a plurality of regional bandmaps in the communication device, each regional band map comprising a subset of frequencies of the world wide bandmap for use in a particular region;

providing a learned bandmap in the communication device, the learned bandmap containing a list of most recently accessed PCCHs, and derived from a present regional bandmap;

powering up the communication device;

scanning the learned bandmap in an attempt to find a PCCH;

scanning the present regional bandmap in an attempt to find a PCCH after scanning the learned bandmap without successfully locating any PCCHs;

selecting a next subset of frequencies from the world wide bandmap after scanning the present regional bandmap without successfully locating any PCCHs; and scanning the next subset of frequencies in an attempt to find a PCCH.

2. A method for registering a communication device as defined in claim 1, further comprising:

reading a public land mobile network (PLMN) code from a broadcast control channel (BCCH) corresponding to a PCCH found while scanning the next subset of frequencies;

determining a new regional bandmap corresponding to the PLMN code; and setting the new regional bandmap to the present regional bandmap.

3. A method for registering a communication device as defined in claim 1, further comprising repeating the scanning the present regional bandmap, selecting a next subset of frequencies from the world wide bandmap, and scanning the next subset of frequencies.

4. A method for registering a communication device as defined in claim 1, wherein the scanning the present regional bandmap is repeated at least twice before performing the scanning the next subset of frequencies from the world wide bandmap a first time.

5. A method for registering a communication device as defined in claim 1, wherein the selecting a next subset of frequencies from the world wide bandmap comprises:

selecting a maximum total frequency scans to perform; and selecting an optimal number of frequencies to be included in the next subset based on the maximum total frequency scans to perform.

6. A method for registering a communication device as defined in claim 1 wherein the scanning the present regional bandmap comprises excluding frequencies already scanned while performing the scanning of the learned bandmap.

7. A method for registering a communication device as defined in claim 1, wherein the selecting a next subset comprises excluding frequencies already scanned while performing the scanning of the learned bandmap and the scanning of the present regional bandmap.

8. A method of finding a primary control channel (PCCH) in a wireless communication system, the method to be performed by a wireless communication device upon being powered up, the wireless communication device having stored in a memory a world wide bandmap containing all frequencies at which PCCHs can be transmitted, and a plurality of regional bandmaps, each regional bandmap containing a subset of the frequencies listed in the world wide bandmap, and corresponding to a particular region of the world, the method comprising:

scanning a present regional bandmap in an attempt to locate a PCCH, the present regional bandmap being the most recently used regional bandmap prior to the wireless communication device being powered up;

selecting a subset of frequencies from the world wide bandmap, excluding frequencies included in the present regional bandmap;

scanning the subset of frequencies after scanning the present regional bandmap without successfully locating any PCCHs; and repeating the scanning the present regional bandmap, selecting a subset of frequencies from the world wide bandmap, where a next subset is selected, and scanning the next subset of frequencies, the repeating being performed at least once.

9. A method of finding a PCCH as defined in claim 8, wherein the selecting a next subset of frequencies from the world wide bandmap comprises:

selecting a maximum total frequency scans to perform; and selecting an optimal number of frequencies to be included in the next subset based on the maximum total frequency scans to perform.

10. A method of finding a PCCH as defined in claim 8, wherein the scanning of the regional bandmap, is performed at least twice in a first instance, and once every instance thereafter.

11. A method of finding a PCCH as defined in claim 8 wherein, upon performing the scanning of the subset of frequencies selected from the world wide bandmap, the method further comprising:

detecting a PCCH at one of the frequencies scanned;

reading a broadcast control channel (BCCH) associated with the PCCH;

obtaining a public land mobile network (PLMN) code from the BCCH;

identifying a country code in the PLMN code; and setting the present regional bandmap to a new regional bandmap corresponding with the country code.

* * * * *